(12) United States Patent
Xue et al.

(10) Patent No.: US 10,058,883 B2
(45) Date of Patent: Aug. 28, 2018

(54) SPECIAL WHEEL SPRAY SUPPORT

(71) Applicant: CITIC Dicastal CO., LTD, Qinhuangdao (CN)

(72) Inventors: Bowen Xue, Qinhuangdao (CN); Guangcai Chen, Qinhuangdao (CN); Jiandong Guo, Qinhuangdao (CN); Le Wang, Qinhuangdao (CN); Weidong Liu, Qinhuangdao (CN); Yao Zheng, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 136 days.

(21) Appl. No.: 15/172,545

(22) Filed: Jun. 3, 2016

(65) Prior Publication Data
US 2016/0354798 A1   Dec. 8, 2016

(30) Foreign Application Priority Data

Jun. 3, 2015   (CN) .......................... 2015 1 0298222

(51) Int. Cl.
B23Q 1/00   (2006.01)
B05B 13/02   (2006.01)

(52) U.S. Cl.
CPC .... B05B 13/0285 (2013.01); *B60B 2310/614* (2013.01); *B60B 2900/112* (2013.01)

(58) Field of Classification Search
CPC .......... B05B 13/0285; B60B 2310/614; B60B 2900/112
See application file for complete search history.

(56) References Cited

U.S. PATENT DOCUMENTS 9,427,849 B2 *   8/2016   McMillan ................. B25B 5/16

* cited by examiner

*Primary Examiner* — David Bryant
*Assistant Examiner* — Nirvana Deonauth
(74) *Attorney, Agent, or Firm* — Maier & Maier, PLLC

(57) ABSTRACT

The present invention discloses a special wheel spray support, which is composed of a base body, a bottom plate, struts, adjusting blocks, supporting pins, protective jackets, a stop pin and the like. When in use, the special wheel spray support of the present invention can meet the requirements for online spraying of special wheels and bolt hole protection, and is not only high in universality and simple in structure, but also has a series of prominent advantages, such as good safety and reliability, low manufacturing cost, etc.

4 Claims, 2 Drawing Sheets

SPECIAL WHEEL SPRAY SUPPORT

TECHNICAL FIELD

The present invention relates to a spray support, in particular to a special wheel spray support.

BACKGROUND ART

The traditional wheel spraying method is to spray the front side of a wheel, with substantially no requirement on back cavity color. In order to meet the requirements of some special vehicles, there are corresponding requirements on the appearance and structure of wheels, and back cavity spraying is one of them. At present, the only way is to spray the wheel with its front side facing downward. However, in terms of product diversity and dimensional diversity, a universal support that satisfies the spraying process requirements has not yet been found.

SUMMARY OF THE INVENTION

It is an object of the present invention to provide a spray support that can meet the requirements for online spraying of special wheels and bolt hole protection.

To achieve the object mentioned above, the technical solution of the present invention is: a special wheel spray support, which is composed of a base body, a bottom plate, rotating shafts, thrust bearings, locking screws, struts, adjusting blocks, supporting pins, protective jackets, floating pins, springs, nuts and a stop pin; the bottom plate is fixed below the base body; the stop pin is fixed above the base body; the bottom plate is connected with the struts through the rotating shafts, and the thrust bearings are fixed between the bottom plate and the struts; the locking screws are mounted on the struts and are in contact with the upper surface of the bottom plate; the adjusting blocks above which the supporting pins are fixed are mated with the struts; the protective jackets are mated with the upper ends of the supporting pins, the springs are fixed within the floating pins through the floating pins, and the nuts are mounted on the top ends of the protective jackets and are in threaded connection with the top ends of the floating pins.

The adjusting blocks can slide randomly on the struts to adjust the size of a pitch circle.

The included angle between the struts can be adjusted by the rotating shafts and the thrust bearings.

Two symmetrical guide grooves are formed in the inner wall of each floating pin and are mated with two guide bars on the corresponding supporting pin.

In actual use, the inner wall of the base body is mated with the struts on a spraying line, and the support is positioned by means of the stop pin; the various supporting pins are mated with wheel bolt holes, and the pitch diameter formed by three supporting pins can be adjusted by adjusting the positions of the adjusting blocks in the struts, so as to obtain compatibility with more wheel profiles of different sizes; the protective jackets are inserted into the supporting pins and are pressed downwardly so that the top ends of guide bars on the supporting pins arrive at an annular groove and then rotate to an angle of 90 degrees, in which case the springs are compressed, the supporting pins are constantly tightly pressed by the lower ends of the floating pins, and the protective jackets are tightly locked; and meanwhile, the lower ends of the protective jackets are closely mated with ball sockets above the wheel bolt holes, thereby preventing generation of gaps between the protective jackets and the wheel bolt holes during vibration.

When in use, the special wheel spray support of the present invention can meet the requirements for online spraying of special wheels and bolt hole protection, and is not only high in universality and simple in structure, but also has a series of prominent advantages, such as good safety and reliability, low manufacturing cost, etc.

Figure 1:
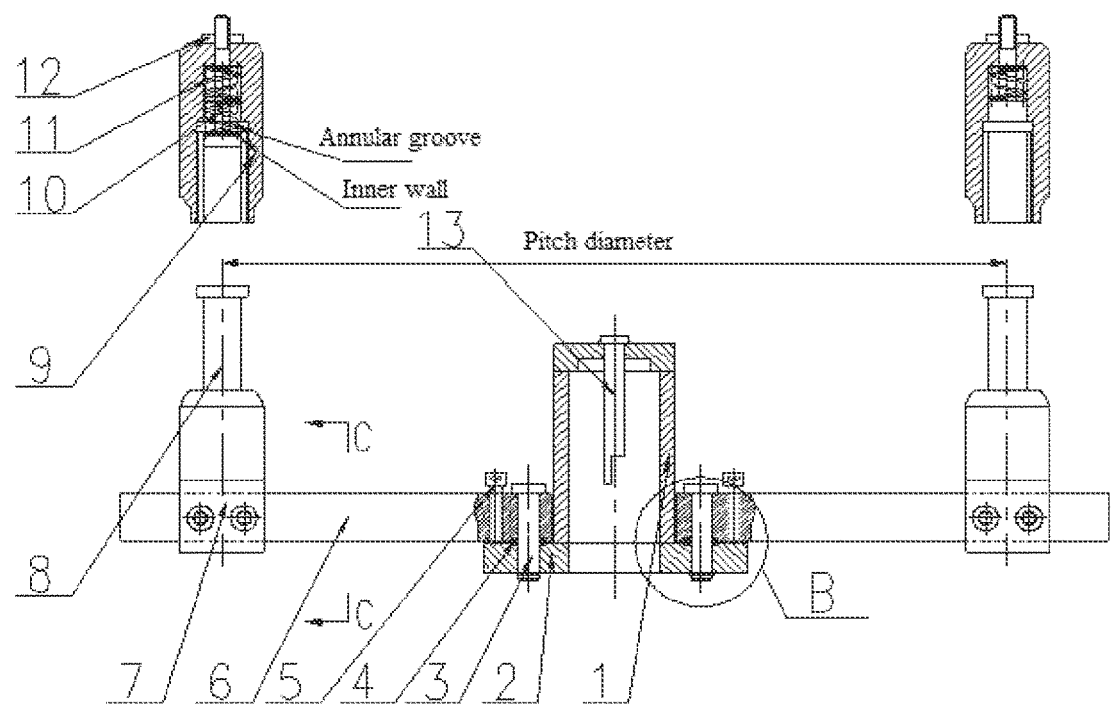
FIG. 1 is a front view of a special wheel spray support of the present invention.
Figure 2:
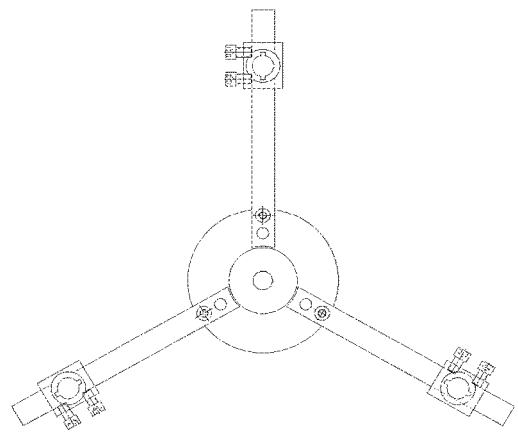
FIG. 2 is a top view of the special wheel spray support of the present invention.
Figure 3:
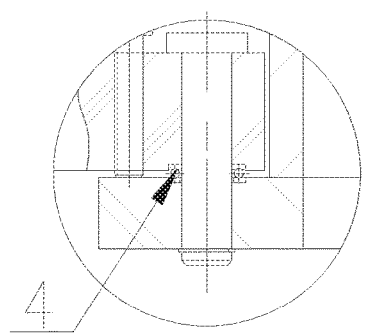
FIG. 3 is a partially enlarged view of portion B of the special wheel spray support of the present invention.
Figure 4:
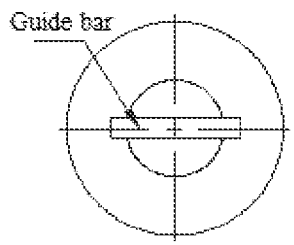
FIG. 4 is a top view of a supporting pin of the special wheel spray support of the present invention.
Figure 5:
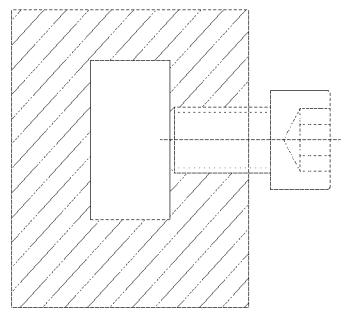
FIG. 5 is a sectional view of the special wheel spray support of the present invention along a direction C.
Figure 6:
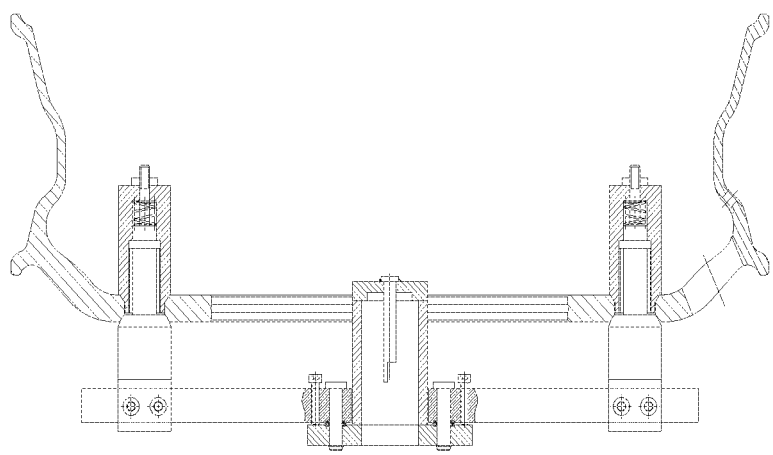
FIG. 6 is a front view of the special wheel spray support of the present invention clamping a wheel.

In the drawings, 1—base body, 2—bottom plate, 3—rotating shaft, 4—thrust bearing, 5—locking screw, 6—strut, 7—adjusting block, 8—supporting pin, 9—protective jacket, 10—floating pin, 11—spring, 12—nut, 13—stop pin and 14—guide bar.

DETAILED DESCRIPTION OF THE INVENTION

Details and working condition of the specific device provided in accordance with the present invention will be described below in conjunction with the accompanying drawings.

The support is composed of a base body 1, a bottom plate 2, rotating shafts 3, thrust bearings 4, locking screws 5, struts 6, adjusting blocks 7, supporting pins 8, protective jackets 9, floating pins 10, springs 11, nuts 12 and a stop pin 13, and is characterized in that: the bottom plate 2 is fixed below the base body 1; the stop pin 13 is fixed above the base body 1; the bottom plate 2 is connected with the struts 6 through the rotating shafts 3, and the thrust bearings 4 are fixed between the bottom plate 2 and the struts 6; the locking screws 5 are mounted on the struts 6 and are in contact with the upper surface of the bottom plate 2; the adjusting blocks 7 above which the supporting pins 8 are fixed are mated with the struts 6; the protective jackets 9 are mated with the upper ends of the supporting pins 8, the springs 11 are fixed within the floating pins 10 through the floating pins 10, and the nuts 12 are mounted on the top end of the protective jackets 9 and are in threaded connection with the top ends of the floating pins 10.

The adjusting blocks 7 can slide randomly on the struts 6 and thus the size of a pitch circle can be adjusted randomly.

The included angle between the struts 6 can be randomly adjusted by the rotating shafts 3 and the thrust bearings 4.

Two symmetrical guide grooves are formed in the inner wall of each floating pin 10 and are mated with two guide bars 14 on the corresponding supporting pin 8.

During working, the inner wall of the base body 1 is mated with the struts on a spraying line, and the support is positioned by means of the stop pin 13; the various supporting pins 8 are mated with wheel bolt holes, and the pitch diameter formed by three supporting pins 8 can be adjusted by adjusting the positions of the adjusting blocks 7 in the struts 6, so as to obtain compatibility with more wheel profiles of different sizes; the protective jackets 9 are inserted into the supporting pins 8 and are pressed downwardly so that the top ends of the guide bars 14 on the supporting pin 8 arrive at an annular groove and then rotate to an angle of 90 degrees, in which case the springs 11 are compressed, the supporting pins 8 are tightly pressed by the lower ends of the floating pins 10 all the time, and the protective jackets 9 are tightly locked; and meanwhile, the lower ends of the protective jackets 9 are closely mated with ball sockets above the wheel bolt holes, thereby preventing generation of gaps between the protective jackets and the wheel bolt holes during vibration.

The invention claimed is:

1. A wheel spray support, comprising a base body, a bottom plate, rotating shafts, thrust bearings, locking screws, struts, adjusting blocks, supporting pins, protective jackets, floating pins, springs, nuts and a stop pin, wherein the bottom plate is fixed below the base body; the stop pin is fixed above the base body; wherein the struts are rotatably mounted on the bottom plate through the rotating shafts, and the thrust bearings are fixed between the bottom plate and the struts; the locking screws are mounted on the struts and are in contact with an upper surface of the bottom plate; wherein the adjusting blocks are mated with the struts, and the supporting pins are fixed on the adjusting blocks; the protective jackets are mated with the upper ends of the supporting pins; the springs are fixed within the protective jackets through the floating pins; and the nuts are mounted on top ends of the protective jackets and are in threaded connection with top ends of the floating pins; and wherein the supporting pins are positioned along a circle's circumference so that they are adaptable to extend through corresponding bolt holes on a wheel, and the wheel can be clamped between the supporting pins and the protective jackets.

2. The wheel spray support according to claim 1, wherein the adjusting blocks slide on the struts.

3. The wheel spray support according to claim 1, wherein an included angle between the struts can be adjusted by the rotating shafts and the thrust bearings.

4. The wheel spray support according to claim 1, wherein two symmetrical guide grooves are formed in an inner wall of each floating pin and are mated with two guide bars on the supporting pin.

* * * * *